United States Patent [19]

Abe

[11] 4,125,847
[45] Nov. 14, 1978

[54] RANGEFINDING MECHANISM

[75] Inventor: Masao Abe, Tokyo, Japan

[73] Assignee: Nihon Beru-Haueru Kabushiki Kaisha (Bell & Howell Japan, Ltd.), Higashimurayama, Japan

[21] Appl. No.: 838,615

[22] Filed: Oct. 3, 1977

[30] Foreign Application Priority Data

Oct. 8, 1976 [JP] Japan .................. 51-121111

[51] Int. Cl.² .................. G03B 7/08; G01J 1/20
[52] U.S. Cl. ...................... 354/25; 250/201; 356/1
[58] Field of Search .......... 356/1; 354/25, 163, 354/195; 352/140; 250/201

[56] References Cited

U.S. PATENT DOCUMENTS

| 3,610,127 | 10/1971 | Ruhle | 354/25 |
| 4,059,756 | 11/1977 | Wilwerding | 354/201 |

Primary Examiner—Michael L. Gellner
Attorney, Agent, or Firm—Aaron Passman; Roger M. Fitz-Gerald; Gerald B. Epstein

[57] ABSTRACT

A rangefinder mechanism is shown in which the scanning mirror has been replaced with a movable scanning optic. The automatic rangefinder system includes a pair of optical paths one a reference path and the other a scanned path which are led to impinge upon a photosensitive surface for comparison purposes. The output of the photosensitive surface is used to adjust the main lens of the camera. Disposed in front of the movable optic is another optical movable relative thereto to coordinate with the position of the main lens of the camera as feedback and adjust the rangefinder system.

11 Claims, 4 Drawing Figures

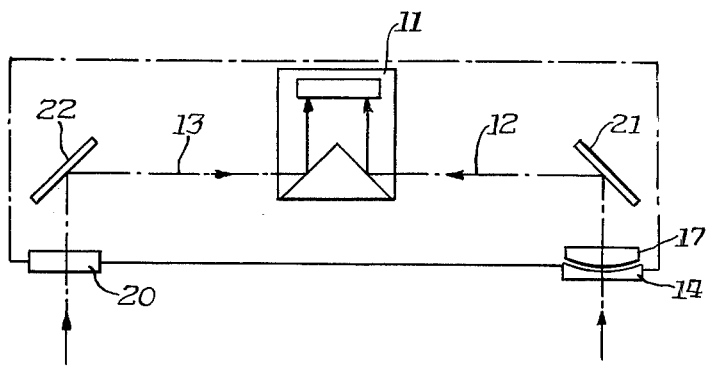
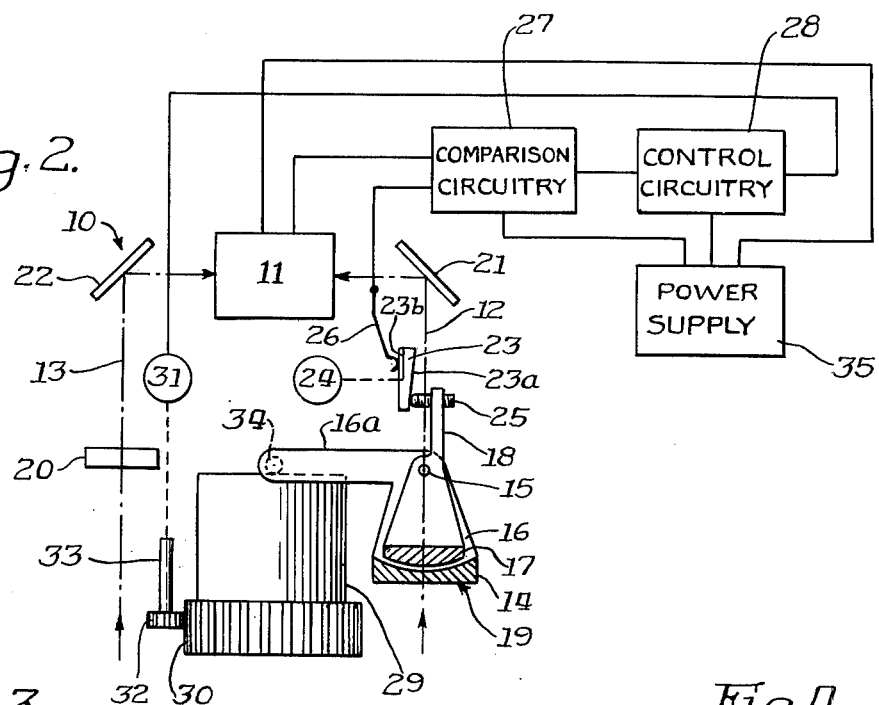
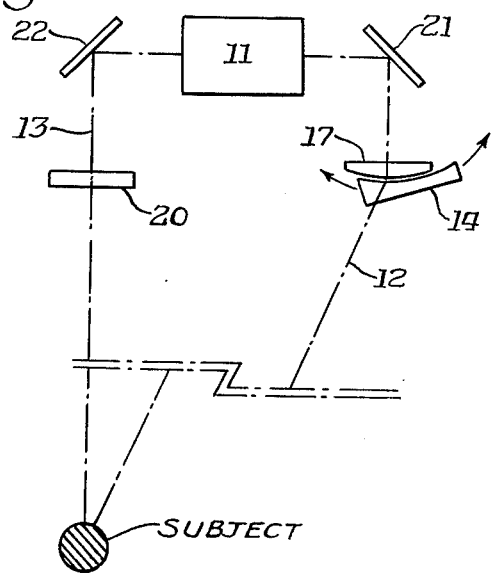
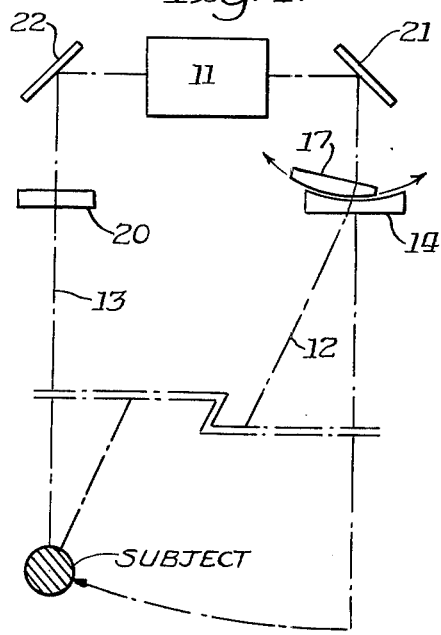

RANGEFINDING MECHANISM

BACKGROUND OF THE INVENTION

This invention relates to automatic rangefinders of the type generally described in U.S. Pat. No. 4,002,899 assigned to Honeywell, Inc. Such automatic rangefinders and focusing systems include two optical paths that bring light from the subject to photosensitive detector. Such detectors are photosensitive devices and as such respond to the fact that both optical systems are aligned with one another and are directed toward the same subject. This alignment is called coincidence and generates a pulse from the optical detector which can be used to adjust the focus of the main camera lens. One of the paths is fixed relative to the rangefinder and the other is movable so as to scan the image. The rangefinding is accomplished by triangulation and comparison of the image from the fixed path with an image from the scanned path. Scanning in these types of rangefinders is normally accomplished by use of a movable mirror to cover the field of view (angular) of the image. The use of such mirrors is cumbersome and does not permit an easy connection for feedback from the main lens. In addition, moving mirror surfaces cause a problem in that the angle of the scan has to be doubled in order to effectively cover the field of view.

It is an object of the present invention to replace the scanning mirror with movable optics which are responsive to the position of the lens and the angular field of view of the subject.

It is a further object of the invention to simplify the structure required to oscillate or scan the subject and thereby improve the reliability and lower the cost of the mechanism for such scanning apparatus.

SUMMARY OF THE INVENTION

There is shown a system for an automatic rangefinder which includes a pair of light paths from the subject to a photosensitive detector. Within the paths is included a pair of fixed mirrors to direct the light paths from the subject to a photosensitive detector and along one of the paths a pair of movable optics is included. The optics consists of a front plano concave lens mounted for movement relative to the position of the main camera lens and a plano convex lens mounted for dithered scanning movement relative to the light path. In combination the aforesaid pair of optics forms a dynamic lens system which provides the requisite scanning and feedback necessary to permit electronic circuitry to compare the output of the photosensitive detector with a reference signal and adjust the main lens accordingly.

BRIEF DESCRIPTION OF THE DRAWINGS

FIG. 1 is a schematic presentation of the automatic rangefinding system of the present invention showing only the optical light paths to the photosensitive detector.

FIG. 2 is a detailed schematic presentation of an automatic rangefinding system with the movable mechanical lens supporting elements shown relative to the electronic control circuitry necessary for the operation of the system.

FIG. 3 is a schematic presentation of how the movement of the plano concave feedback lens influences the scanned light path. FIG. 4 is a schematic presentation of how the movement of the plano convex scanning lens causes the light path to scan the subject.

DETAILED DESCRIPTION OF THE DRAWINGS

An automatic rangefinder 10 controlled by electronic sensing circuitry is shown in FIG. 2 and it includes a simple scanning system 19 responsively coupled to the focusing lens 29 for feedback input. In FIG. 1, there is a photosensitive detector 11 which generates a pulse when the objective images received from the subject coincide. The images are brought along two rangefinder light paths 12 and 13 to the photosensitive detector 11. The scanning system 19 is in light path 12 and includes movable optics between the subject and the photosensitive detector 11. There is a front lens 14 of plano concave shape carried on a pivotal frame 16 which is movable in an horizontal plane about an axis 15. The flat plano surface (lens 14) faces the subject. Immediately behind lens 14 juxtaposed thereto and also along light path 12 is a rear lens 17 of plano convex shape; it is carried on another pivoting frame 18 which is also movable in an horizontal plane on axis 15. The flat plano surface of lens 17 faces away from the subject. Frame 18 rides juxtaposed above frame 16. As will be described in detail, frames 16 and 18 adjust the movable optics 14 and 17 for feedback and scanning respectively.

The scanning system 19 consists of lenses 14 and 17 which are carried along light path 12 and when lenses 14 and 17 are positioned axially in line with one another as shown in FIGS. 1 and 2 they present light path 12 with a plano parallel glass objective which does not deflect light path 12. In order to introduce a similar medium in light path 13, there is a flat glass 20 interposed in light path 13. Thus, the light coming from the subject to the photosensitive detector 11 must pass through the same amount of optical resistance, be it lenses or distance. Similarly, there are mirrors 21 and 22 positioned along both optical paths 12 and 13 which deflect the image from the subject toward the photosensitive detector 11. Mirror 22 is positioned between flat glass 20 and photosensitive detector 11 and mirror 21 is positioned between scanning system 19 and photosensitive detector 11.

Scanning system 19 is responsive to the main focusing lens 29 by means of a contact arm 16a of movable frame 16. Contact arm 16a carries a pin 34 which rides on an edge of focusing lens 29 such that as lens 29 moves axially fore or aft pin 34 is pushed accordingly. Because frame 16 is pivotally mounted at axis 15, plano concave lens 14 moves arcuately with respect to the axial motion of focusing lens 29. Similarly, plano convex lens 17 carried on frame 18 is responsive to a double face cam 23. A spring (not shown) biases a cam follower 25 against cam 23. Cam 23 is rotated by motor 24 and has a cam face 23a designed to transmit reciprocating motion to cam follower 25. Cam follower 25 is threaded to be adjustably positioned in a threaded portion of frame 18 such that as face cam 23 rotates follower 25 reciprocates moving frame 18 arcuately about axis 15 causing plano convex lens 17 to reciprocate arcuately relative to path 12. As shown in FIG. 4, movement of lens 17 causes path 12 to angularly scan the field of the subject. Similarly in FIG. 3 the arcuate motion of lens 14 relative to path 12 causes a deflection of path 12 relative to the subject. The combined movement of lenses 17 and 14 permits a simple mechanism to scan and adjust the incoming path 12 according to the position of the focusing lens 29.

As mentioned, the face cam 23 is a double face cam. That is to say that the side opposite cam 23a has a switching cam recess 23b which is used to provide a periodic reference signal for the comparison electronic circuitry 27. More particularly, there is a switch contact arm 26 which rides on grooved face cam 23b. Arm 26 periodically dips into groove 23b causing a signal to be sent to comparison electronic circuitry 27. Also connected to circuitry 27 is photosensitive detector 11. In a manner well known photosensitive detector 11 puts out a peak signal relative to a given time interval as established by the periodic signal of cam 23b when the image from the subject brought on path 13 and the image from the subject brought on path 12 coincide. The signal generated by cam 23b is timed to occur once in every revolution of the double face cam 23; when the optical axis of the movable scanning system 19 is aligned with the axis that is normal to the plano surfaces in the position shown in FIGS. 1 and 2 the timed signal is transmitted by cam 23b. When lens 17 is oscillated to a point where path 12 is transmitting the same image to photosensitive detector 11 as is being transmitted on path 13, a pulse is sent from detector 11 to the comparison circuitry 27. The periodic signal and peak pulse are spaced apart in time in accordance with the difference (angular) between the path 12 at the instance when lens 17 is rotated to bend path 12 towards the subject and when lenses 14 and 17 are positioned as in FIGS. 1 and 2. That difference is calculated by the electronic comparison circuitry 27 and fed into the electronic control circuitry 28.

In operation a power supply 35 supplies energy to the various circuits and motors. When the control circuit 28 receives the signal of the difference from electronic comparison circuitry 27 power is accordingly relayed to a lens control motor 31. Motor 31 includes a motor shaft 33 connected to a motor pinion gear 32. Enmeshed with pinion 32 is a lens gear 30 circumferentially mounted about focusing lens 29. As the control circuit 28 relays energy to the motor 31 which turns lens 29 for focus adjustment, the lens 29 moves axially along its optical axis and transmits that motion to pin 34 on arm 16a of frame 16 thereby arcuately moving lens 14 and further deflecting path 12 between the subject and the lens 17. It will be appreciated that the correction applied by lens 14 will decrease the difference between the reference signal from cam 23b and the coincidence pulse from the path 13 and the scanning path 12. This decrease in difference is a proximate result of the feedback input from focusing lens 29 through lens 14. As this difference becomes zero, the control response relayed from control circuitry 28 also becomes zero.

As those skilled in the art will no doubt appreciate many changes and refinements can be made to the construction and it is therefore contemplated that the claims which follow will cover all of the various combinations, permutations and arrangements that are possible.

What is claimed is:

1. In a camera with a focusable main lens and an automatic rangefinder therefor the latter having a photosensitive detector responsive to light from a subject received along two separate optical paths and adapted to transmit a pulse when the received light from the paths is in coincidence and to adjust the lens to focus on an image plane comprising:

a main focusing lens for a camera mounted for fore and aft movement relative to the camera for focus adjustment, a first optical system defining a reference path between the subject and a photosensitive detector surface having an optical axis fixed relative to said rangefinder and aimed substantially the same as the optical axis for said main focusing lens, a second optical system for defining a path along which light may be transmitted from the subject to a photosensitive detector surface including a second optical axis movable relative to said first optical axis, a first rangefinder objective mounted for regular periodic movement relative to said second optical system path to generate a scanned movement of said optical axis therefor, a second rangefinder objective drivingly connected to said main focusing lens for movement across said second optical system path for deflection thereof in response to the adjusted focus position of said main focusing lens, electronic timing means connected between said photosensitive detector surface and said periodically moving first objective for measuring the time differential between said coincidence pulse received from the former and said periodic signal received from the latter, and electronic control means connected to receive a signal relative to said measured time differential and having a power driven member responsive thereto for moving said focusing lens in accordance with said amount of measured differential to thereby adjust the focus position of said focusing lens.

2. The camera and automatic rangefinder of claim 1 wherein said first objective and said second objective have at least one instantaneous point in their movements whereat said second optical system path is not deflected and its optical axis responds as though said first and second objectives were a plane flat glass lens normal thereto.

3. The camera and automatic rangefinder of claim 2 wherein said first objective is a plano concave lens and said second objective is a juxtaposed plano convex lens with said plano surfaces facing opposite one another toward subject and the photosensitive detector, respectively.

4. The camera and automatic rangefinder of claim 2 wherein said first and second paths impose substantially the same optical and distance influence upon the light transmitted from the subject to the photosensitive surface such that the intensity of light from said paths is about the same.

5. The camera and automatic rangefinder of claim 1 wherein said first objective is mounted for pivotal movement relative to said second optical system path and is driven by a rotating face cam for periodic pivotal movement.

6. The camera and automatic rangefinder of claim 5 wherein said second objective is mounted for pivotal movement relative to said second optical system path and is coupled to said main focusing lens so that fore and aft movement of said focusing lens causes relative arcuate movement of said second objective across said second optical system path.

7. The camera and automatic rangefinder of claim 6 wherein said first objective is a plano concave lens and said second objective is a juxtaposed plano convex lens with plano surfaces facing opposite one another toward the subject and the photosensitive detector, respectively.

8. The camera and automatic rangefinder of claim 5 wherein said face cam includes a discontinuity along another surface thereof for activating a switching means to transmit a periodic signal to said electronic timing means and thereby defining each revolution thereof.

9. The camera and automatic rangefinder of claim 8 wherein said timing means is a comparison circuit for calculating the timed difference between when the coincidence pulse and the periodic signal are received and for providing an output signal in accordance therewith to said control means for operation thereof.

10. The camera and automatic rangefinder of claim 9 wherein said control means responds to said output signal by supplying power to a motor connected to drive said focus lens in or out along its optical axis.

11. The camera and automatic rangefinder of claim 10 wherein said main focus lens is threadably mounted to the camera and includes a circumferentially mounted gear for engaging with a pinion on said motor.

* * * * *